United States Patent [19]

Satomi

[11] Patent Number: 5,381,906
[45] Date of Patent: Jan. 17, 1995

[54] PAPER STOCK CLEANING AND COLLECTING APPARATUS

[75] Inventor: Hitoshi Satomi, Shizuoka, Japan

[73] Assignee: Satomi Seisakusho Co., Ltd., Shizuoka, Japan

[21] Appl. No.: 163,744

[22] Filed: Dec. 7, 1993

[30] Foreign Application Priority Data

Mar. 22, 1993 [JP] Japan .................................. 5-060811

[51] Int. Cl.6 .................................................. B03B 7/00
[52] U.S. Cl. ......................................... 209/17; 209/273; 209/284
[58] Field of Search ................. 209/17, 300, 306, 273, 209/284

[56] References Cited

U.S. PATENT DOCUMENTS

| | | | |
|---|---|---|---|
| 3,981,738 | 9/1976 | Rao et al. | 209/273 X |
| 4,042,503 | 8/1977 | Justus | 209/273 X |
| 4,153,543 | 5/1979 | Hanson | 209/273 X |
| 4,961,844 | 10/1990 | Ekholm et al. | 209/273 |
| 4,981,583 | 1/1991 | Le Blanc | 209/273 |
| 4,991,720 | 2/1991 | Höglund et al. | 209/17 |
| 5,078,859 | 1/1992 | Satomi | 209/17 |

Primary Examiner—D. Glenn Dayoan
Attorney, Agent, or Firm—Kanesaka & Takeuchi

[57] ABSTRACT

The paper stock cleaning and collecting apparatus of the present invention includes a tank with an open top for receiving and storing therein a paper stock, a cylindrical screen for dividing an interior of the tank into a first chamber and a second chamber, a cylinder-type rotational element coaxially provided with the cylindrical screen in the first chamber, a paper stock supply pipe attached to the first chamber at one side to supply the paper stock in the tank, a discharge pipe for discharging foreign materials contained in the paper stock in the first chamber of the tank, and a paper stock adjusting device communicating with the second chamber and adjusting the paper stock in the tank to a predetermined amount to remove unnecessary materials in the second chamber. A circulation passage for connecting an intake side of the rotational element in the first chamber and an exhaust side thereof may be formed.

7 Claims, 5 Drawing Sheets

PAPER STOCK CLEANING AND COLLECTING APPARATUS

BACKGROUND OF THE INVENTION AND RELATED ART STATEMENT

The present invention relates to a paper stock cleaning and collecting apparatus and, more particularly, to a paper stock cleaning apparatus wherein cleaning and collection of paper stock in a tank have been improved.

A conventional paper stock cleaning and collecting apparatus comprises a screen for dividing a tank into a first chamber and a second chamber, and a rotational element disposed to face against the screen and provided in the first chamber. (Japanese Utility Model Application Publication No. Hei 2-16466)

In the paper stock cleaning apparatus, a material called "tail" which can not pass through the screen still contains useful paper stock, so that the tail has to be re-processed by another screen.

In order to solve the problem, the present applicant proposed a paper stock cleaning and collecting apparatus, wherein an amount of the useful paper stock which can not pass through the screen is reduced, in Japanese Patent Application No. Hei 3-311099 filed on Nov. 26, 1991.

However, in the above paper stock cleaning and collecting apparatus, since the tank provided therein with the screen is sealed, light and fine foreign materials such as oil, pitch and styrol which are adhering to the paper stock are discharged together with the useful paper stock, so that the foreign materials can not be removed from the useful paper stock. Further, when the screen is washed, a relatively heavy cover on a top of the tank has to be removed, and the work for removing the cover is very troublesome.

Accordingly, one object of the present invention is to provide a paper stock cleaning and collecting apparatus, wherein the above-mentioned problems have been solved.

Another object of the present invention is to provide a paper stock cleaning apparatus as stated above, wherein cleaning and collection of a paper stock in a tank have been improved.

A still further object of the present invention is to provide a paper stock cleaning apparatus as stated above, which can be easily and economically manufactured.

Further objects and advantages of the invention will be apparent from the following description of the invention.

SUMMARY OF THE INVENTION

To attain the above objects, a paper stock cleaning and collecting apparatus according to the present invention comprises a tank with an open top for receiving and storing a paper stock, a cylindrical screen for dividing the tank into a first chamber and a second chamber, a cylinder-type rotational element disposed to face against the screen and provided in the first chamber, a rotating member fixed to the same rotary shaft as that of the cylinder-type rotational element at a position remote from an inlet side of the paper stock of the tank, a water supply pipe for supplying water into the first chamber of the tank from a side of the rotating member, a water supply valve provided in the water supply pipe, a discharge pipe for discharging the paper stock in the first chamber of the tank from the side of the rotating member, a discharge valve provided in the discharge pipe and paper stock controlling means communicating with the second chamber and controlling an amount of the paper stock in the tank.

Further, the paper stock cleaning and collecting apparatus of the present invention comprises a tank with an open top for receiving and storing a paper stock, a cylindrical screen for dividing the tank into a first chamber and a second chamber, a cylinder-type rotational element provided in the first chamber and disposed to face against the screen, a rotating member fixed to the same rotary shaft as that of the cylinder-type rotational element at a position remote from an inlet side of the paper stock of the tank, a water supply pipe for supplying water to the first chamber of the tank from the rotating member side, a water supply valve disposed at the water supply pipe, a discharge pipe for discharging the paper stock in the first chamber from the rotating member side, a discharge valve provided at the discharge pipe, a circulation passage for connecting an inlet side and an outlet side of the rotational element of the first chamber, a circulation valve provided at the circulation passage, and paper stock controlling means communicating with the second chamber and controlling an amount of the paper stock in the tank.

Still further, a paper stock cleaning and collecting apparatus of the present invention comprises a tank with an open top for receiving and storing a paper stock, a cylindrical screen for dividing the tank into a first chamber and a second chamber, a cylinder-type rotational element disposed to face against the screen and provided in the first chamber, a discharge pipe for discharging the paper stock in the first chamber of the tank, a discharge valve provided at the discharge pipe, and paper stock controlling means communicating with the second chamber and controlling an amount of the paper stock in the tank.

In the paper stock cleaning and collecting apparatus formed as described above, the useful paper stock having passed through the screen contains light and fine foreign materials such as oil, pitch and styrol, while air existing in the paper stock and water becomes fine bubbles by impulse waves of the cylinder-type rotational element when the paper stock passes through the screen, to thereby promote floating of the foreign materials to an upper surface of the tank wherein the top is opened. Thus, the foreign materials can be surely removed from the paper stock. Further, the paper stock in the tank is controlled by the paper stock control means to a certain amount.

The raw paper material is separated by the cylinder-type rotational element and the cylindrical screen, and the raw material has a higher concentration as the raw material is brought closer to the side of the rotating member. However, in case the water supply valve is opened and the discharge valve is closed, and then water is supplied to the first chamber of the tank from the side of the rotational element through the water supply pipe, the raw material is diluted with the water and, at the same time, the water supplied to the first chamber of the tank from the side of the rotating member collides with the paper stock supplied by the cylinder-type rotational element to produce an agitation state. Thus, the paper stock is separated from other materials and sufficiently collected through the screen.

DETAILED DESCRIPTION OF THE PREFERRED EMBODIMENTS

Figure 1:
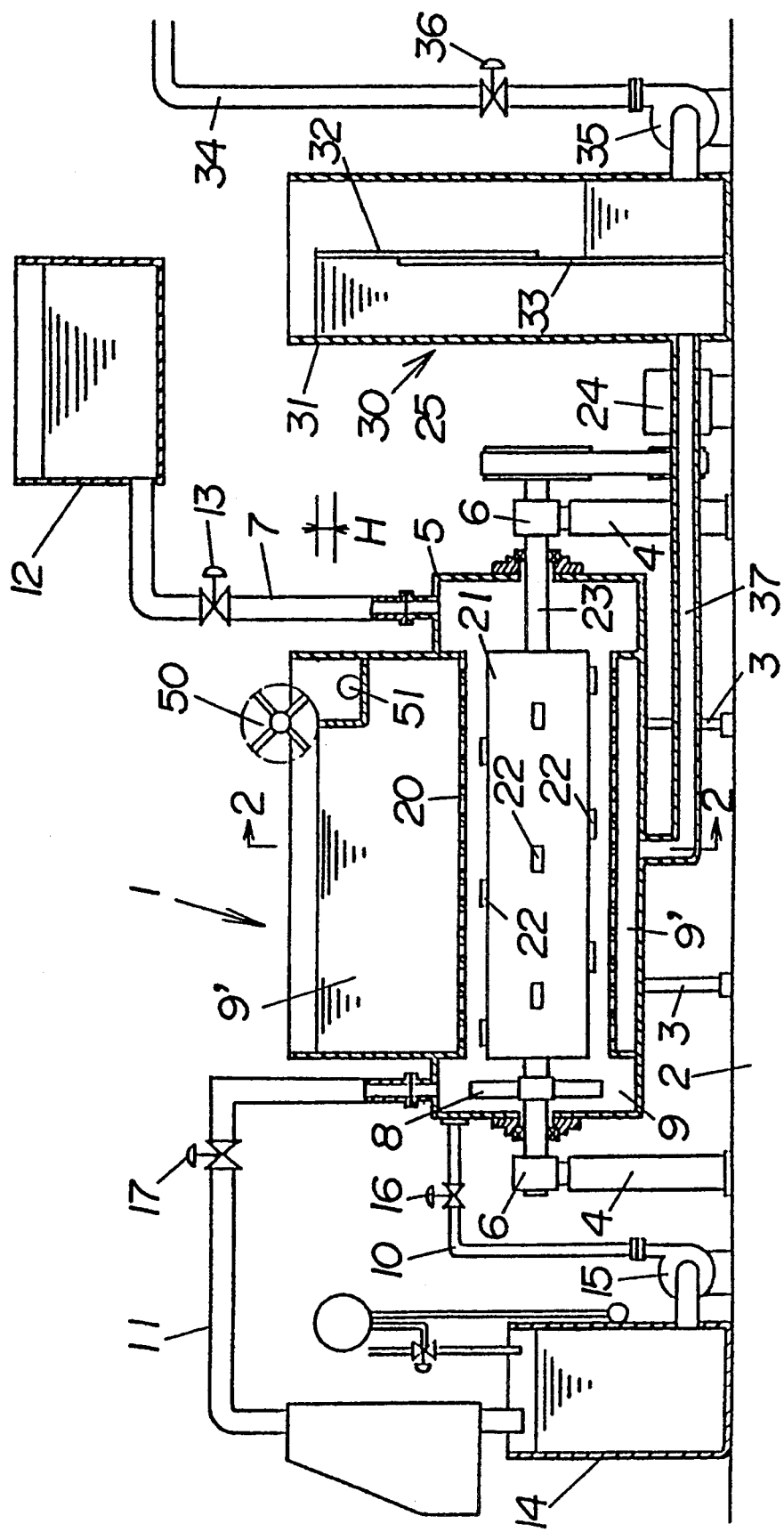
FIG. 1 is a schematic partial section view of a paper stock cleaning and collecting apparatus of a first embodiment of the present invention.
Figure 2:
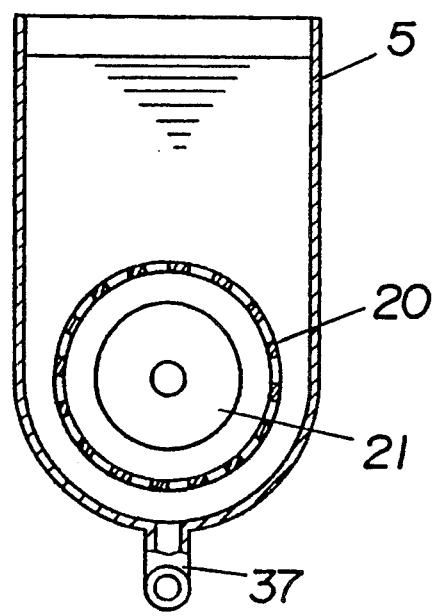
FIG. 2 is a schematic section view taken along a line 2—2 of FIG. 1.

Referring to FIGS. 1 and 2, a first embodiment of the present invention is shown. A paper stock cleaning and collecting apparatus 1 is supported on a base stand 2 through fittings 3 and 4. A tank 5 has no cap thereon so as to be open, and receives and stores therein a paper stock. The tank 5 is connected to a first or supply pipe 7 for supplying a raw material or paper stock, a water supply pipe 10 for supplying water into a first chamber 9 of the tank 5 from the side of a rotational element or a rotating member 8, and a discharge pipe 11 for discharging the paper stock in the first chamber 9 of the tank 5 from the side of the rotational element 8.

The first pipe 7 has another end connected to a tank 12 storing the raw material paper stock, and a valve in the middle thereof. The water supply pipe 10 has another end connected to a tank 14 for storing water, and a pump 15 and a water supply valve 16 on the way to the tank 14. The discharge pipe 11 has another end put into the tank 14 for storing water, and a discharge valve 17 on the way to the tank 14.

The tank 5 is provided therein with a cylindrical screen 20 so as to divide the interior of the tank 5 into the first chamber 9 and a second chamber 9'. The cylindrical screen 20 may be formed of a screen comprising a plurality of round holes or, for example, slits of 0.15 mm (not shown).

A cylinder-type rotational element 21 is disposed in the first chamber 9 to face against the cylindrical screen 20. The cylinder-type rotational element 21 is stepwisely provided on the side surface with a plurality of projections 22.

The rotational element 8 is fixed to a rotary shaft 23, such as an impeller, to which the cylinder-type rotational element 21 is also fixed, at a position remote from a paper stock supply side of the tank 5. The rotary shaft 23 is rotated by a motor 24 through a belt 25.

A paper stock controlling device 30 communicates with the second chamber 9' of the tank 5 to control the paper stock in the tank 5 to a predetermined amount. For example, an amount of the paper stock in the tank can be controlled by adjusting a movable plate 32 provided at one side of a tank 31 communicating with the second chamber 9' through a pipe 37. The movable plate 32 slides vertically along a fixed plate 33 so that the height of the movable plate 32 can be adjusted. A discharge pipe 34 is connected to the other side of the tank 31, and provided with a pump 35 and a switching valve 36. Incidentally, a difference H between horizontal planes of the tank 5 and the tank 31 is created due to friction loss when the raw material paper stock passes through the pipe 37 from the tank 5 to the tank 31.

When the raw material paper stock is supplied from the raw material tank 12 to the tank 5 and then the motor 24 is driven, the rotary shaft 23 is rotated through the belt 25. According to the rotation of the rotary shaft 23, the cylinder-type rotational element 21 and the rotational element 8 such as an impeller are also rotated, for example at a peripheral speed of 24 m/s. The paper stock in the tank 5 is powerfully agitated by the projections 22 provided on the side surface of the cylinder-type rotational element 21, and effectively separated by the screen 20 in the tank 5.

While the raw material has a higher concentration as the raw material is brought closer to the side of the rotational element 8, the concentrated raw material is diluted by water supplied into the first chamber 9 of the tank 5 from the side of the rotational element 8 through the water supply pipe 10 when the water supply valve 16 is opened and the discharge valve 17 is closed by a control device, not shown. At the same time, the water supplied from the side of the rotational element 8 into the first chamber 9 of the tank 5 and the paper stock supplied to the cylinder-type rotational element 21 collide with each other so as to produce an agitating state or scramble washing. Especially, in case the raw material paper stock is for containers for milk, by the above-mentioned agitation, vinyl and paper are separated, so that the paper stock is well collected by the screen 20.

The paper stock having passed through the screen 20 contains light and fine foreign materials such as oil, pitch and styrol. However, air existing in the paper stock and water passes through the screen 20 and becomes fine bubbles by impulse waves of the cylinder-type rotational element 21 rotated at a high speed, to thereby promote floating of the foreign materials to the upper surface of the tank 5, and the foreign materials can be easily separated and removed by a rotary plate 50 such as a scum scraper. The removed foreign materials are discharged through a pipe 51. On the other hand, the useful paper stock from which the foreign materials have been removed is introduced into another process through the pipe 37, the tank 31 and the discharge pipe 34.

Incidentally, when the paper stock is discharged through the discharge pipe 11, the discharge valve 17 is opened by a timer of the control device, not shown, or manually. When the timer is used, the discharge valve 17 is intermittently switched. For example, it is closed for about 20 minutes and then opened for about 30 seconds. Further, when the discharge valve 17 is closed, the water supply valve 16 is opened and vice versa.

Figure 3:
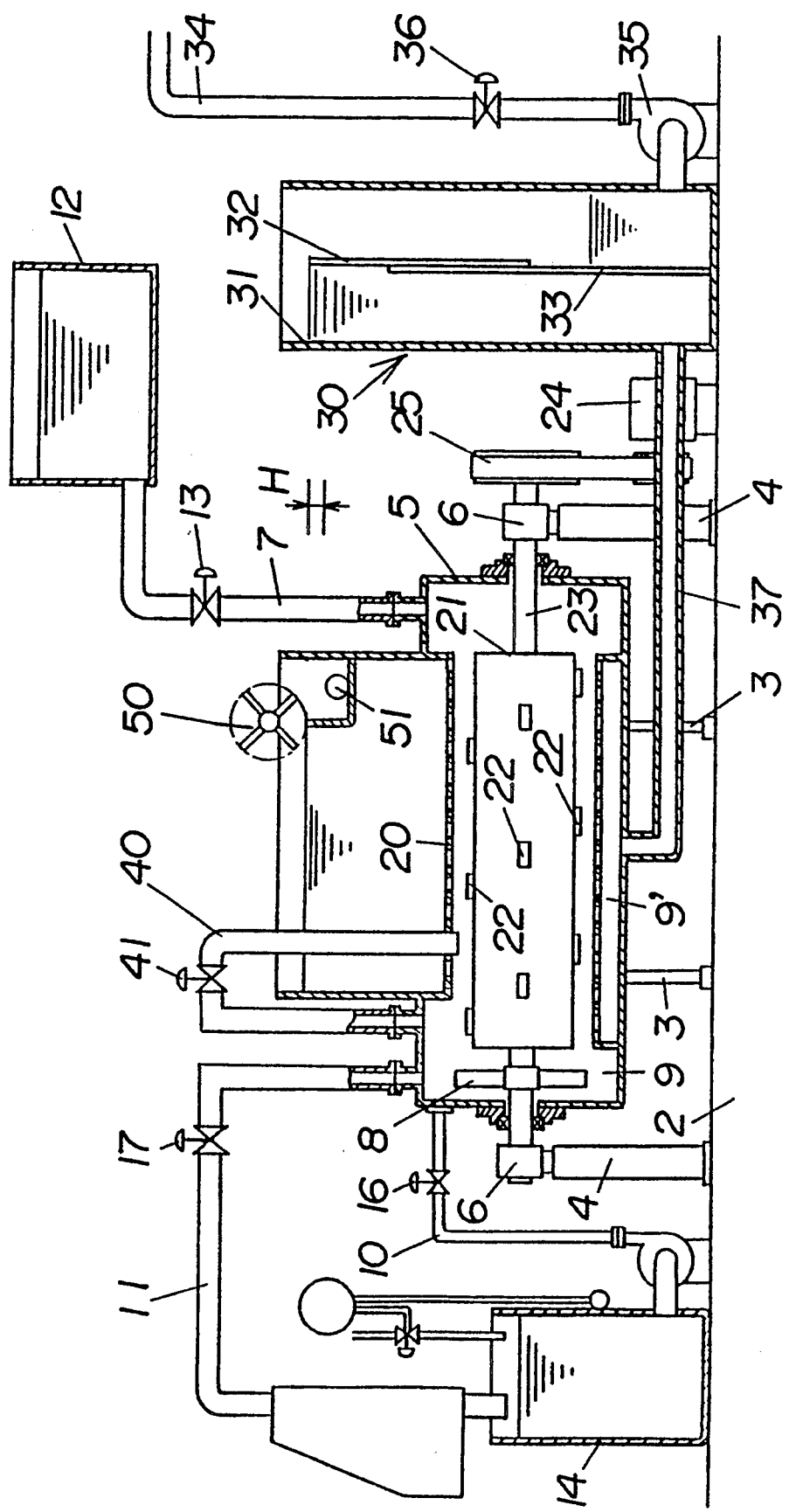
FIG. 3 is a schematic partial section view of a paper stock cleaning and collecting apparatus of a second embodiment of the present invention.

FIG. 3 shows a paper stock cleaning and collecting apparatus 1 of a second embodiment of the present invention, in which elements and parts corresponding to those in the first embodiment as shown in FIGS. 1 and 2 are indicated by the same symbols. The paper stock cleaning apparatus 1 comprises a tank 5 having an open top and receiving and storing therein a paper stock, a cylindrical screen 20 for dividing the interior of the tank into a first chamber 9 and a second chamber 9', a cylinder-type rotational element 21 provided in the first chamber 9 and disposed to face against the screen 20, a rotational element or a rotating member 8 fixed on the same rotary shaft 23 as that of the cylinder-type rotational element 21 and at a position remote from a paper stock receiving side of the tank 5, a water supply pipe 10 for supplying water to the first chamber 9 of the tank 5 from a side of the rotational element 8, a water supply valve 16 provided at the water supply pipe 10, a discharge pipe 11 for discharging the paper stock of the first chamber 9 of the tank 5 from the side of the rotational element 8, a discharge valve 17 provided at the discharge pipe 11, a circulation passage 40 for connecting an intake side to an exhaust side of the rotational element 8 of the first chamber 9, a circulation valve 41 provided on the circulation passage 40, and a paper stock controlling device 30 which communicates with the second chamber 9' of the tank 5 to control the paper stock in the tank 5. Incidentally, switching of the water supply valve 16, discharge valve 17 and circulation valve 41 is controlled by a timer of a control device, not shown, or manually. When switching is controlled by the timer, the discharge valve 17 is switched intermittently. For example, the water supply valve 16 and the circulation valve 41 are opened for about 20 minutes, and then the discharge valve 17 is opened. When the water supply valve 16 and the circulation valve 41 are closed, the discharge valve 17 is opened. When the water supply valve 16 and the circulation valve 41 are opened, the discharge valve 17 is closed.

Accordingly, as described in the first embodiment, in a state where raw material paper stock is supplied from a tank 12 and is stored in the tank 5, when a motor 24 is driven, the rotary shaft 23 is rotated through a belt 25. In accordance with the rotation, the cylinder-type rotational element 21 and the rotational element 8 such as an impeller are also rotated, for example at a peripheral speed of 24 m/s. The paper stock in the tank 5 is powerfully agitated by the projections 22 provided on the side surface of the cylinder-type rotational element 21, and efficiently separated in the tank 5.

While the raw material has a higher concentration as the raw material is brought closer to the side of the rotational element 8 of the cylinder-type rotational element 21, the concentrated raw material is diluted by water supplied into the first chamber 9 of the tank 5 from the side of the rotational element 8 through the water supply pipe 10 when the water supply valve 16 and the circulation valve 14 are opened and the discharge valve 17 is closed by a control device, not shown. At the same time, the water supplied from the side of the rotational element 8 into the first chamber 9 of the tank 5 and the paper stock supplied by the cylinder-type rotational element 21 collide with each other so as to produce an agitating state or scramble washing. Especially, in case the raw material paper stock is for containers for milk, vinyl and paper are separated by the above-mentioned agitation, and the paper stock is removed from the foreign materials so that the paper stock is effectively collected through the screen 20.

The paper stock having passed through the screen 20 contains light and fine foreign materials such as oil, pitch and styrol. However, air existing in the paper stock and water passes through the screen 20 and becomes fine bubbles by impulse waves of the cylinder-type rotational element 21 rotated at a high speed, to thereby promote floating of the foreign materials to the upper surface of the tank 5 with open top and the foreign materials can be easily separated and removed by a rotary plate 50 such as a scum scraper. The removed foreign materials are discharged through a pipe 51. As a result, the useful paper stock from which the foreign materials are removed is introduced into another process through the pipe 37, the tank 31 and the discharge pipe 34.

Incidentally, for example, when the water supply valve 16 and the circulation valve 41 are closed by a timer of a control device, not shown, or manually, and the discharge valve 17 is opened, paper stock containing many foreign materials is discharged through the discharge pipe 11.

Figure 4:
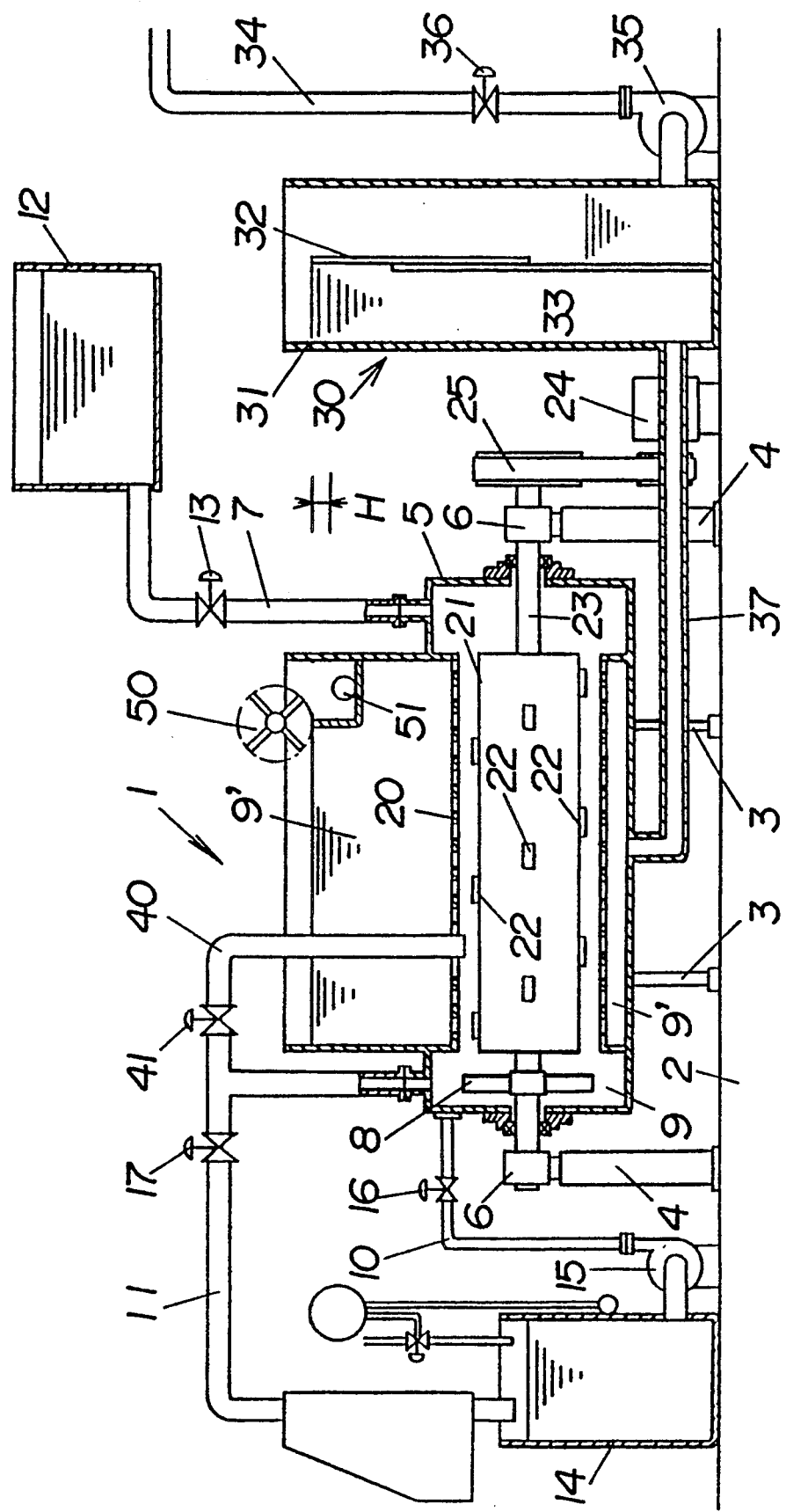
FIG. 4 is a schematic partial section view of a paper stock cleaning and collecting apparatus of a third embodiment of the present invention.

While, in FIG. 3, the discharge pipe 11 and the circulation passage 40 are provided separately, in a third embodiment of the present invention, as shown in FIG. 4, the discharge pipe 11 may be used in common as a part of the circulation passage 40. In a paper stock cleaning and collecting apparatus 1 of the third embodiment of the present invention as shown in FIG. 4, the elements and parts corresponding to those in FIGS. 1 and 2 are indicated by the same symbols.

Figure 5:
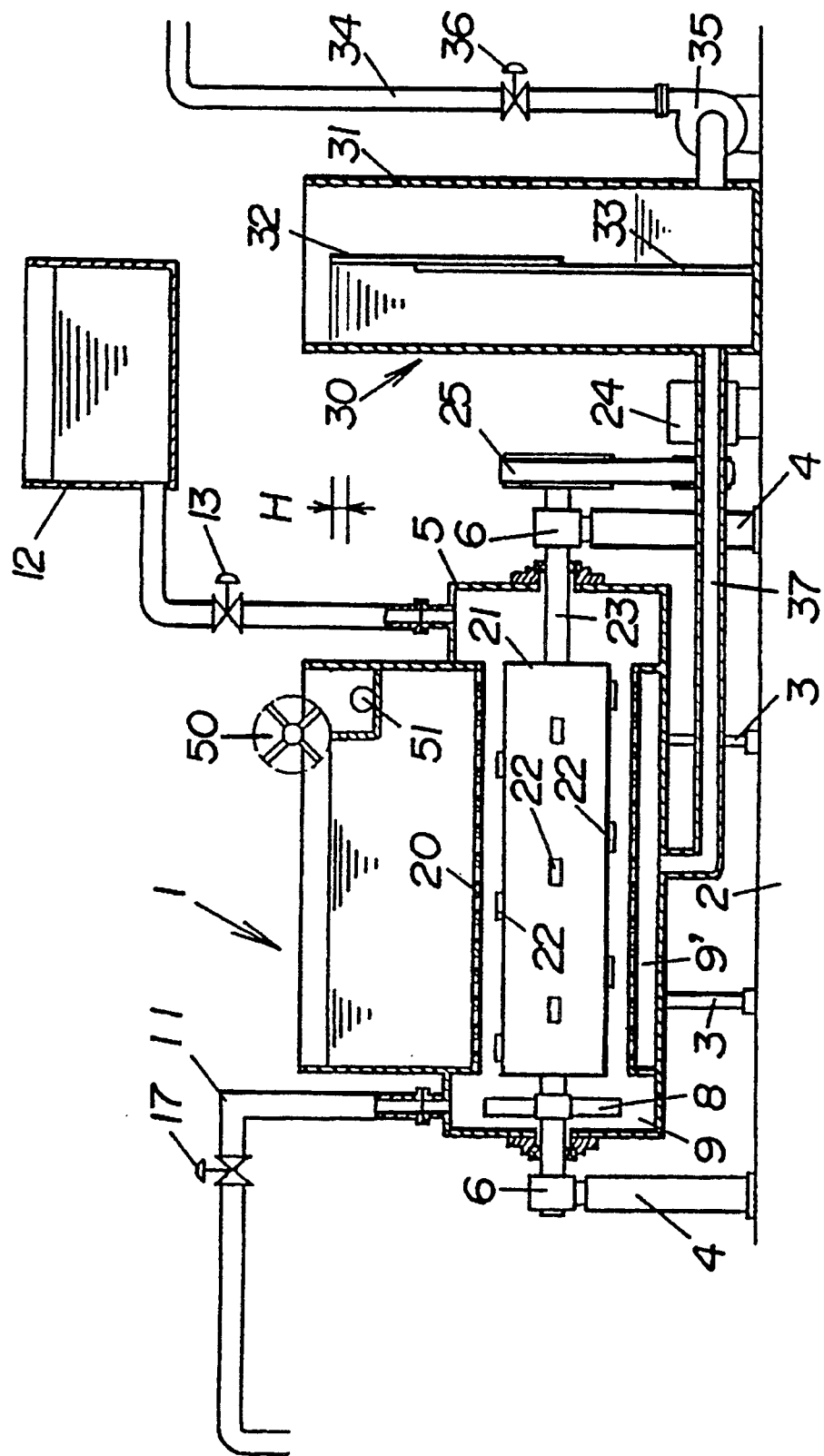
FIG. 5 is a schematic partial section view of a paper stock cleaning and collecting apparatus of a fourth embodiment of the present invention.

Further, while in the precedent embodiments, the water supply pipe 10 and the circulation passage 40 are provided, a paper stock cleaning and collecting apparatus 1 without the supply pipe 10 and the passage 40 can be formed as a fourth embodiment shown in FIG. 5. In the fourth embodiment of the paper stock cleaning and collecting apparatus 1, elements and parts corresponding to those shown in FIGS. 1 and 2 are indicated by the same symbols.

More specifically, the paper stock cleaning and collecting apparatus 1 comprises a tank 5 having an open top and receiving therein a paper stock, a cylindrical screen 20 for dividing the interior of the tank 5 into a first chamber 9 and a second chamber 9', a cylinder-type rotational element 21 disposed to face against the screen 20, a discharge pipe 11 for discharging the paper stock in the first chamber 9 of the tank 5, a discharge valve 17 provided at the discharge pipe 11 and a paper stock controlling device 30 communicating with the second chamber 9' of the tank 5 and controlling the paper stock in the tank 5 to a certain amount.

Under a condition that the discharge valve 17 is closed and the paper stock from a tank 12 storing raw material is supplied to the tank 5, when a motor 24 is driven, a rotary shaft 23 is rotated through a belt 25 and the cylinder-type rotational element 21 is also rotated, for example, at a peripheral speed of 24/ms. The paper stock in the tank 5 is powerfully agitated by the projections 22 provided on the side surface of the cylinder-type rotational element 21, and effectively separated in the tank 5.

The useful paper stock having passed through the screen 20 contains light and fine foreign materials such as oil, pitch and styrol. However, air existing in the paper stock and water passes through the screen 20 and becomes fine bubbles by impulse waves of the cylinder-type rotational element 21 rotated at a high speed, to thereby promote floating of the foreign materials to the upper surface of the tank 5 with open top and the foreign materials can be easily separated and removed by a rotary plate such as a scum scraper 50. The removed foreign materials are discharged through a pipe 51, while the remaining useful paper stock is introduced to another process through a pipe 37, a tank 31 and a discharge pipe 34.

After the apparatus is operated for a while, the discharge valve 17 is opened and paper stock containing many foreign materials is discharged through the discharge pipe 11. The discharge valve 17 is switched by a control device, not shown, or manually as in the precedent embodiments. The rotary element 8 may be omitted. (FIG. 5)

Incidentally, in the first through fourth embodiments as shown in FIGS. 1 through 5, air existing in the paper stock and water passes through the screen 20 and becomes fine bubbles by impulse waves of the cylinder-type rotational element 21 rotated at a high speed to thereby promote floating of the foreign materials to the upper surface of the tank 5 with open top. Preferably, it is also possible that a bubble generator, not shown, is provided in the first chamber 9 or the second chamber 9' of the tank 5 to thereby promote floating of foreign materials.

In the first embodiment of the paper stock cleaning and collecting apparatus of the present invention, light and fine foreign materials such as oil, pitch and styrol which have passed through the screen become very light, and air existing in the paper stock and water becomes fine bubbles by passing through the screen due to impulse waves of the cylinder-type rotational element driven at a high speed, to thereby promote floating of the foreign materials to the upper surface of the tank with the open top. Therefore, the foreign materials can be easily separated and removed from the paper stock. Further, paper stock in the tank is controlled to a certain amount by paper stock control device so that the paper stock in the tank can be prevented from overflowing from the tank. Furthermore, while the raw material is agitated by the cylinder-type rotational element and the cylindrical screen, and has a higher concentration as the raw material is brought closer to the side of the rotational element, the concentrated raw material is diluted with water supplied into the first chamber of the tank from the side of the rotational element through the water supply pipe under the state that the water supply valve is opened and the discharge valve is closed. Moreover, the paper stock supplied by the cylinder-type rotational element collides with water supplied from the side of the rotational element into the first chamber of the tank so as to produce an agitating state or scramble washing. As a result, the paper stock is sufficiently separated and collected.

Also, in the second and third embodiments of the paper stock cleaning and collecting apparatus of the present invention, the paper stock in the first chamber is circulated through the circulation passage. Thus, the paper components are well separated from the foreign materials and is sufficiently recovered.

In the invention, the paper stock in the tank is controlled by the paper stock control device to maintain a certain amount or level, so that the paper stock is prevented from overflowing from the tank.

While the invention has been explained with reference to the specific embodiment of the invention, the explanation is illustrative and the invention is limited only by the appended claims.

What is claimed is:

1. A paper stock cleaning and collecting apparatus comprising:
   a tank with an open top for receiving and storing a paper stock;
   a cylindrical screen situated in the tank for dividing the tank into a first chamber and a second chamber;
   a cylinder-type rotational element coaxially provided in said cylindrical screen in the first chamber;
   a stock supply pipe attached to the first chamber of the tank at one side thereof, said stock supply pipe supplying the paper stock to the tank,
   a discharge pipe attached to the first chamber of the tank at a side opposite to the stock supply pipe, said discharge pipe discharging a foreign material contained in the paper stock; and
   paper stock adjusting means communicating with the second chamber and adjusting the paper stock in said tank to a predetermined level so that foreign materials passing through said screen and floating to an upper surface of the paper stock in the tank are removed from the paper stock at the second chamber without overflowing of the paper stock.

2. A paper stock cleaning and collecting apparatus as claimed in claim 1, wherein said paper stock adjusting means includes an adjusting tank for receiving the paper stock flown from the second chamber, and a movable plate situated in the adjusting tank for adjusting the height of the paper stock in the adjusting tank, the upper surface of the paper stock in the tank being controlled by the movable plate.

3. A paper stock cleaning and collecting apparatus as claimed in claim 2, wherein said tank includes a plate at an upper portion thereof, the foreign materials floating in the second chamber being removed by the plate.

4. A paper stock cleaning and collecting apparatus as claimed in claim 3, wherein said plate in the tank is a rotary plate.

5. A paper stock cleaning and collecting apparatus as claimed in claim 3, further comprising a rotating member disposed coaxially with said cylinder-type rotational element at a position remote from the stock supply pipe, a water supply pipe attached to the tank near the discharge pipe, said water supply pipe supplying water into the first chamber for diluting the paper stock and providing scramble washing, and a valve attached to the water supply pipe for supplying water to the tank.

6. A paper stock cleaning and collecting apparatus as claimed in claim 5, further comprising a circulation pipe connected between an intake side of said rotational element in the first chamber and an exhaust side thereof, and a valve provided at said circulation pipe.

7. A paper stock cleaning and collecting apparatus as claimed in claim 6, wherein said discharge pipe forms a part of the circulation pipe.

* * * * *